United States Patent [19]
Milam et al.

[11] B 3,999,865
[45] Dec. 28, 1976

[54] METHOD AND APPARATUS FOR DETERMINING THE MECHANISM RESPONSIBLE FOR LASER-INDUCED DAMAGE

[75] Inventors: David Milam, Dublin, Calif.; Rudolph A. Bradbury, Saugus, Mass.; Richard H. Picard, Bedford, Mass.; Michael Bass, Pacific Palisades, Calif.

[73] Assignee: The United States of America as represented by the Secretary of the Air Force, Washington, D.C.

[22] Filed: Dec. 9, 1974

[21] Appl. No.: 530,569

[44] Published under the second Trial Voluntary Protest Program on March 16, 1976 as document No. B 530,569.

[52] U.S. Cl. .............................. 356/239; 250/572; 356/205
[51] Int. Cl.² ...................................... G01N 21/16
[58] Field of Search ............ 356/51, 201, 205, 237, 356/239; 250/360, 562, 563, 572

[56] References Cited
UNITED STATES PATENTS
3,767,304  10/1973  Keenan et al. ..................... 356/237
3,811,782   5/1974  Kerr ................................. 356/201

Primary Examiner—Vincent P. McGraw
Attorney, Agent, or Firm—Joseph E. Rusz; Jacob N. Erlich

[57] ABSTRACT

A system is described for determining the mechanism responsible for laser-induced damage in a sample which utilizes a procedure of sequentially irradiating a large number of sites using a tightly focused laser beam whose intensity is constant in time. A statistical analysis of survival times yields a determination that damage was due to one of the following mechanisms:
1. linear absorption,
2. nonlinear absorption,
3. absorbing inclusions,
4. mechanical defects, or
5. electron-avalanche breakdown.

10 Claims, 11 Drawing Figures

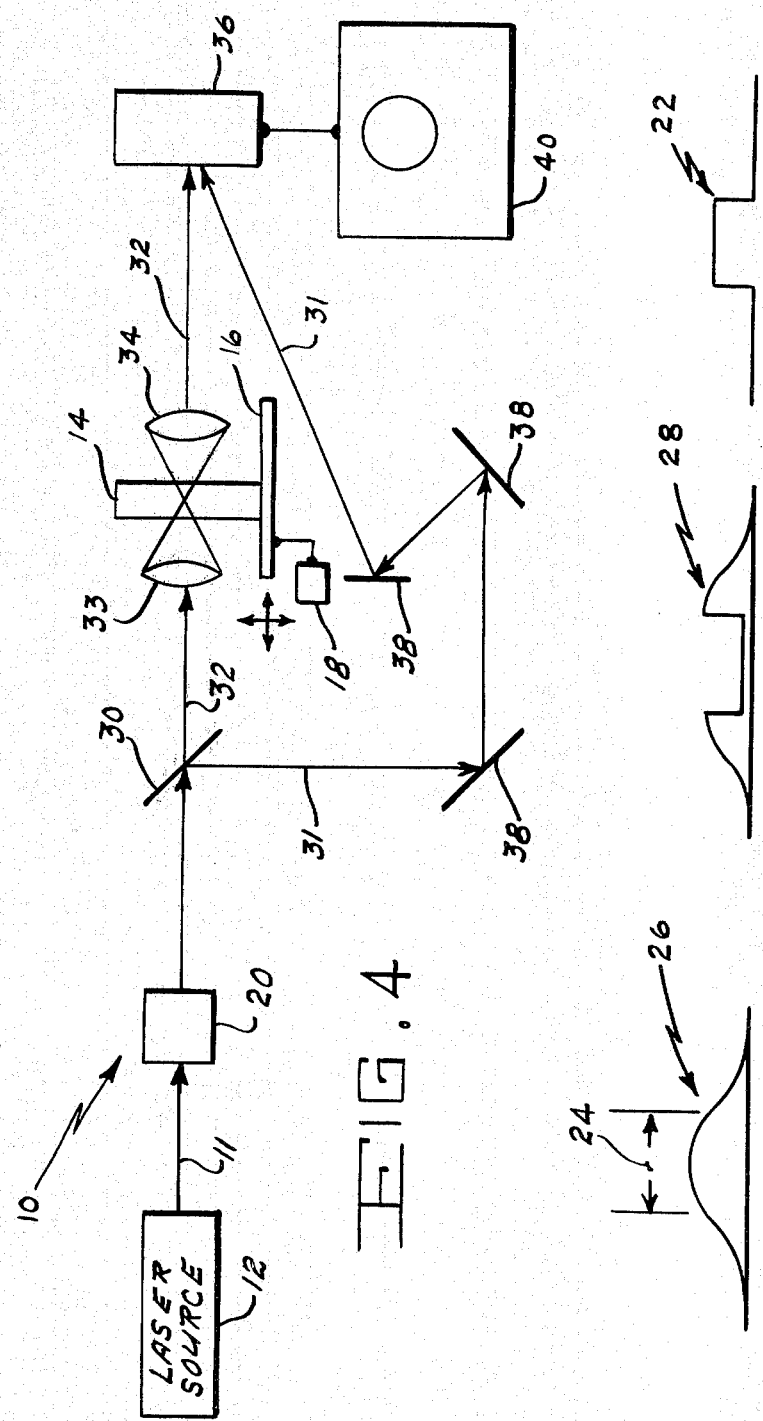

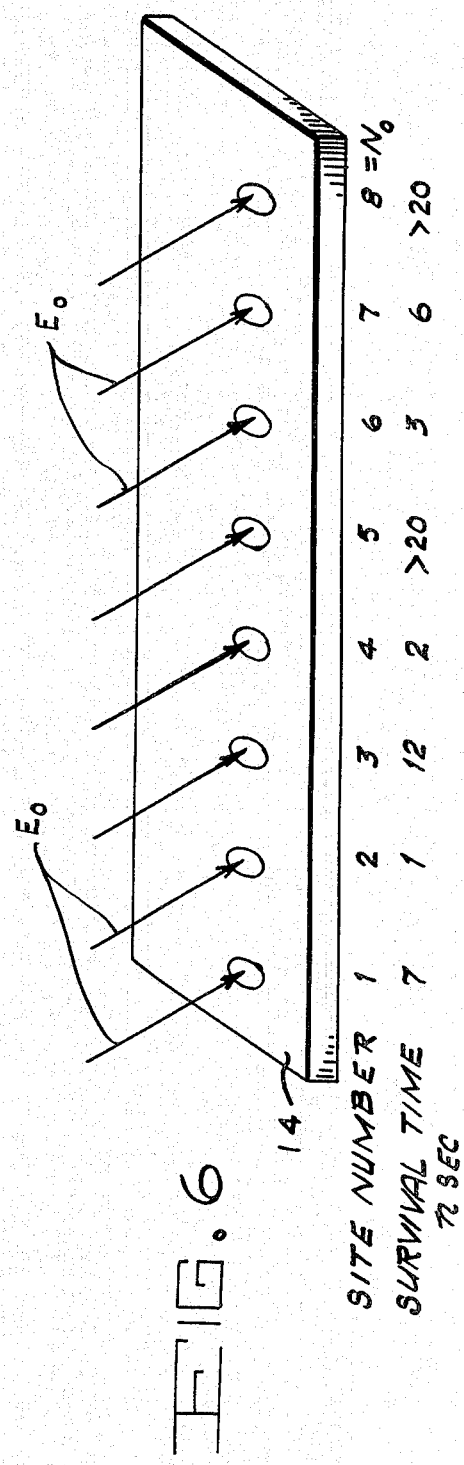
FIG. 6
| SITE NUMBER | 1 | 2 | 3 | 4 | 5 | 6 | 7 | 8 = $N_0$ |
|---|---|---|---|---|---|---|---|---|
| SURVIVAL TIME $T_i$ SEC | 7 | 1 | 12 | 2 | >20 | 3 | 6 | >20 |
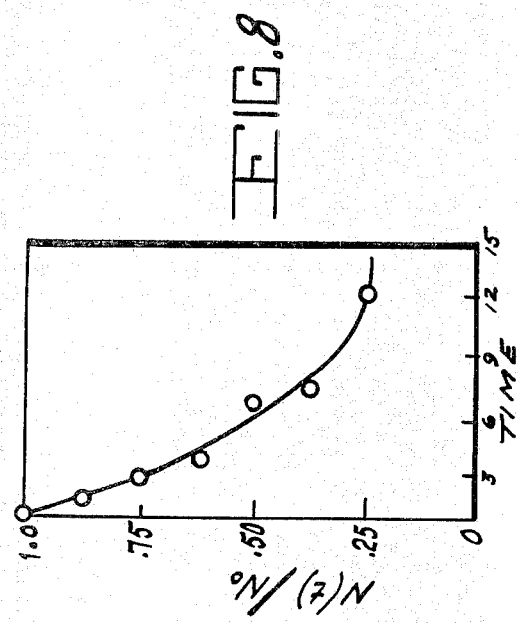
FIG. 8
| TIME | 0 | 1 | 2 | 3 | 6 | 7 | 12 | |
|---|---|---|---|---|---|---|---|---|
| DAMAGED | 0 | 1 | 1 | 1 | 1 | 1 | 1 | |
| $N(t)$ | 8 | 7 | 6 | 5 | 4 | 3 | 2 | |
| $N(t)/N_0$ | 1 | .88 | .75 | .63 | .50 | .38 | .25 | |
FIG. 7

METHOD AND APPARATUS FOR DETERMINING THE MECHANISM RESPONSIBLE FOR LASER-INDUCED DAMAGE

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the analysis of sample damage, and, more particularly, to a method and apparatus which is capable of determining the physical mechanism responsible for laser-induced damage within a sample.

Lasers have found use today in a great variety of applications. For example, lasers are found in the area of optical communications, holography, medicine, cutting, calculating and radar. In these areas the laser depends upon greatly amplifying its existing radiation.

A typical laser is made of a column of active material having a partly reflecting mirror at one end thereof and a fully reflecting mirror at the other end. Unfortunately in many instances the reflective surfaces utilized in high power laser structures are themselves damaged. Heretofore, although the damage was detectable, there was no way in which to determine the reason for such damage. It is essential in order to produce more powerful and reliable lasers to know why such damage takes place in order to provide reflective surfaces which will not fail during laser operation.

SUMMARY OF THE INVENTION

The instant invention not only sets forth a method and apparatus for determining the reasons for laser-induced damage within a sample and overcomes the problems set forth hereinabove, but also is capable of determining the mechanism which produces damage in a sample by any electromagnetic radiation.

In the instant invention the sample to be analyzed is sequentially irradiated at a large number of sites using a tightly focused laser beam whose intensity remains substantially constant in time. The time interval for which each site remains undamaged is recorded. A statistical analysis of these survival times will yield a determination that damage was due to one of the following mechanism:
1. linear absorption,
   nonlinear absorption,
3. absorbing inclusions,
4. mechanical defects such as scratches, pits or voids, or
5. electron-avalanche breakdown.

The apparatus of this invention utilized to make the above determination is made up of a $TEM_{oo}$-mode, single-longitudinal-mode, laser source emitting a smooth waveform, a shutter, beam focusing equipment, a fast optical waveform detector, oscilloscope, and a sample located on a precision translation stage which allows irradiation of arbitrarily chosen sites on the sample. Such a system is the only known systematic technique for identifying the cause of laser-induced damage.

It is therefore an object of this invention to provide a method and apparatus for successfully determining the physical mechanism responsible for damage induced within a sample by electro-magnetic radiation, and, in particular, laser-induced damage.

It is another object of this invention to provide a method and apparatus for determining the physical mechanism responsible for electro-magnetic radiation-induced damage which is both highly reliable and economical.

DESCRIPTION OF THE DRAWING

FIG. 4 is a schematic diagram of the apparatus of this invention utilized in determining the damage mechanism in a laser-induced damaged sample;

FIG. 4a is the square-waveform pulse emitted after the shutter in the apparatus of this invention shown in FIG. 4;

FIG. 4b is the smoothly varying pulse emitted by the laser source of the apparatus of this invention set forth in FIG. 4;

FIG. 4c is the waveform rejected by the shutter set forth in the apparatus of this invention shown in FIG. 4;

FIG. 6 shows an experimental damage situation with the apparatus of this invention setting forth a plurality of damage sites and survival times;

FIG. 7 is a table more clearly setting forth the data presented in FIG. 6; and

FIG. 8 is a survival curve based on the information presented in the table shown in FIG. 7.

DETAILED DESCRIPTION OF THE PREFERRED EMBODIMENT

Figure 1:
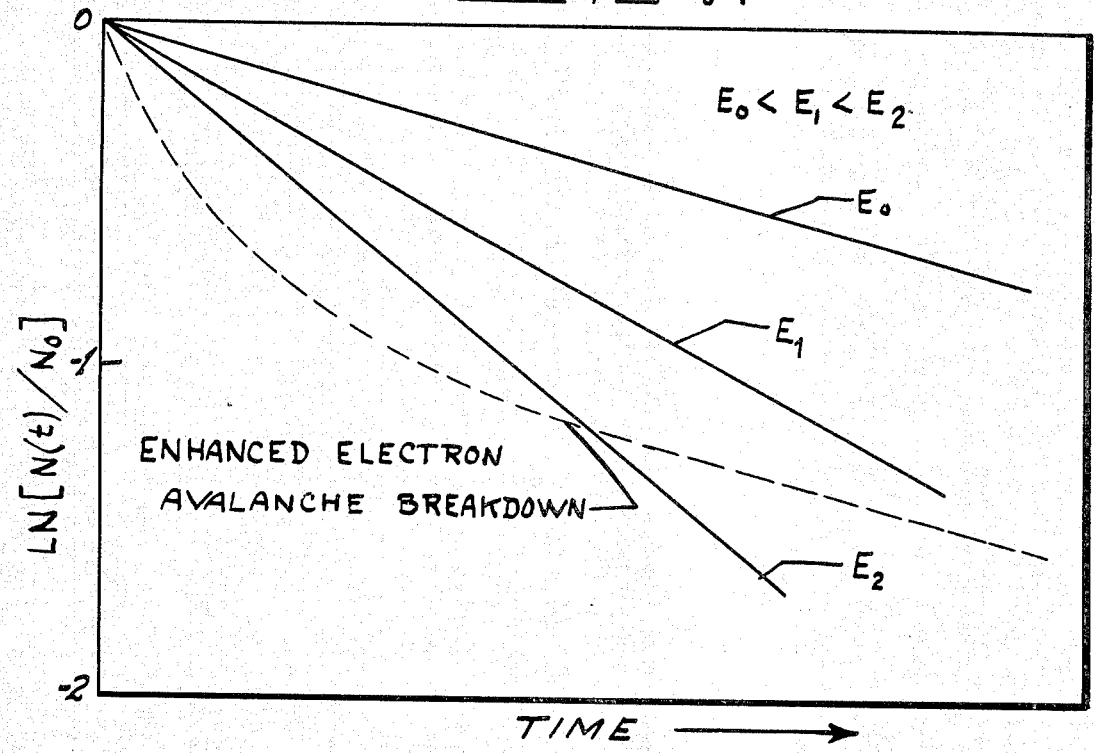
FIG. 1 represents survival curves characteristic of electron-avalanche breakdown.

In the instant invention the mechanism responsible for laser-induced damage is determined from the statistical fluctuation in the times required to produce damage at many sites which are sequentially irradiated by equally intense, square-waveform pulses. These damage mechanisms are separated into three general categories:
1. damage due to homogeneous absorption,
2. damage due to material defects or inclusions, and
3. intrinsic damage due to electron-avalanche breakdown or other fast intrinsic mechanisms.

The technique involved with this invention considers an ensemble of identically irradiated sites, $N_o$ in number, which are damaged by the apparatus of this invention at an instantaneous rate $h(t)$. If $N(t)$ is the number of sites undamaged at time $t$, then $$\frac{dN(t)}{dt} = -h(t)N(t),$$

$$\ln\left(\frac{N(t)}{N_0}\right) = -\int_0^t h(t')\, dt'.$$

The function $N(t)/N_0$ is related to the damage statistics, since it is the probablity of a site surviving for a time $t$ without damaging. We define the plot of ln $(N(t)/N_0)$ versus $t$ to be the survival curve and note that it depends only on the integral of the rate function $h(t)$ which is determined only by the damage mechanisms in operation and the waveform of the irradiation.

The problem is in every way analogous to fluorescence decay, with irradiated but undamaged sites being the analogue of excited molecules and $h(t)$ being the analogue of the fluorescence decay rate. The damage rate may depend on several mechanisms, just as fluorescent de-excitation may proceed via several different channels. Accordingly, we define $h(t)$ as a sum $$H(t) = \sum_{j=1}^{n} h_j(t)$$

where one term $h_j(t)$ is included for each of the $n$ damage mechanisms under consideration. If the computed functional forms $h_j(t)$ are sufficiently unique, and if one term dominates the sum in a given sample, the limiting damage mechanism can be ascertained by comparing the experimentally determined survival curves with those computed for the various possible damage mechanisms.

A particularly important advantage of the procedure of this invention outlined hereinabove is that damage mechanisms can be identified without determining the absolute level of irradiation. Mechanism identification is based solely on a comparison of functional forms. Absolute power density measurements, which have traditionally been the most difficult aspect of damage experiments can be avoided if one only wishes to determine the damage mechanism.

The first step necessary in determining the mechanisms which produce laser-induced damage is the preparation of survival curves depicting the various categories of damage mechanisms set forth hereinabove. For example, the rate of damage by electron-avalanche breakdown has been given in the form $$h_{ea}(t) = A_0 e^{-K/E(t)}$$

where $K$ is a material constant and $E(t)$ is the applied optical electric field. If $E(t)$ has the form $$E(t) = \begin{cases} 0 & (t<0) \\ E_0 & (0 \leq t \leq t_1) \\ 0 & (t>t_1) \end{cases}$$

the rate $h_{ea}(t)$ is also a constant, $$h_{ea}(t) = A_0 e^{-K/E_0} = \Gamma(E_0).$$

In this case, the survival curve found at a particular power level $E_0$ is a linear function of time, as shown in FIG. 1.

Following the observation that the local value of the optical electric field within the dielectric was the controlling factor in many damage experiments, the electric-field enhancement at mechanical defects of various shapes has been described. The enhanced field will lead to enhanced probabilities for avalanche development. We can use the curves shown in FIG. 1 to illustrate the survival curves appropriate to defect-enhanced avalanche breakdown. Assume that we apply the field $E_0$ to $N_0$ sites, and that some sites contain mechanical defects. If, for simplicity, we consider only two types of defects, some sites will experience enhanced fields $E_1$ and $E_2$, such that $$E_2 > E_1 > E_0.$$

Then, instead of observing only sites damaging at the intrinsic avalanche breakdown rate $\Gamma(E_0)$, we will also observe subsets of sites which damage at the higher rates $\Gamma(E_1)$ and $\Gamma(E_2)$. The observed survival curve will be a nonlinear function of time whose slope is initially large and then decreases, since the survival probability is the sum of three exponentials with different time constants. Similar survival curves will be observed if many types of mechanical defects are considered.

If the field $E_0$ is reduced until only the enhanced rate $\Gamma(E_2)$ is observable experimentally, the survival curve, even though resulting from enhanced avalanche breakdown, will be linear in time. It is only by generating survival curves at a number of optical power levels, beginning with the lowest that produces a measurable damage rate, that the intrinsic avalanche breakdown of a perfect dielectric can be distinguished from the breakdown at sites containing defects. For a perfect dielectric the survival curve is a linear function whose slope increases with increasing field amplitude. On the other hand, for a dielectric with mechanical defects, the survival curve is linear only at lowest field which produces damage, but become nonlinear as the field is increased.

If the sample is a homogeneous absorber, all equivalently irradiated sites will survive until they simultaneously reach a damaging temperature $T_d$. The damage probability per unit time for absorption will approach a delta function centered about the time $t_a$ at which the sites damage. The fractional number of survivors $N(t)/N_0$ will remain at unity until $t_a$, then fall rapidly to zero. An increase in the applied field $E_0$ will decrease $t_a$. The manner in which $t_a$ decreases with increasing $E_0$ will reveal whether the absorption is linear or nonlinear. Observation of the proper relationship between $E_0$ and $t_a$ is possible only if the irradiated area is sufficiently large so that heat diffusion out of the irradiated area is negligible.

Figure 2:
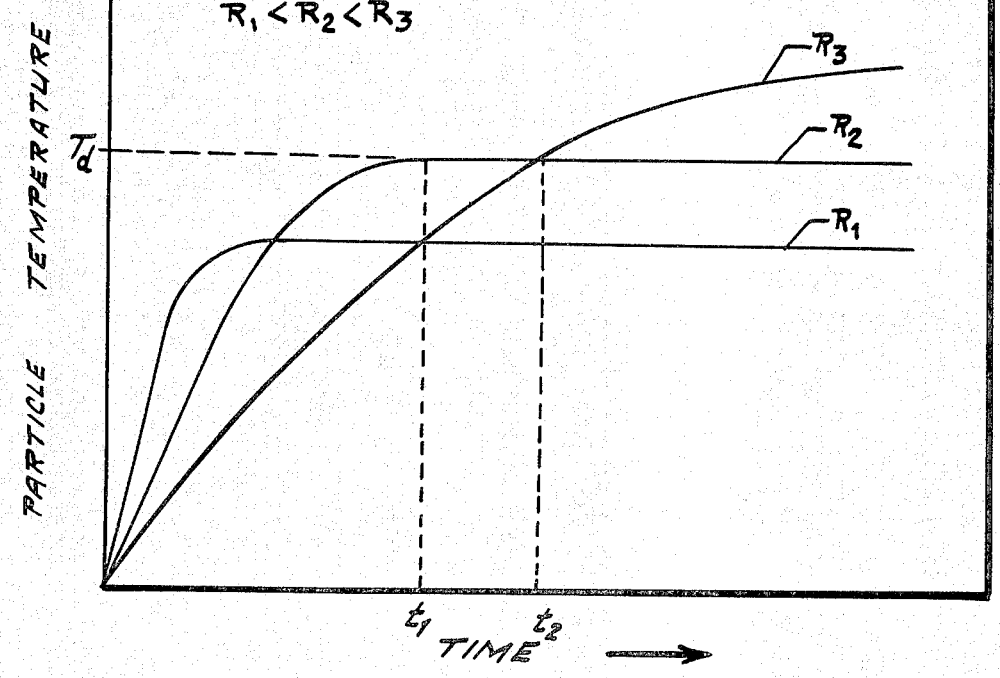
FIG. 2 represents a curve of temperature as a function of time for spherical absorbing inclusions heated by an optical field.

If metallic or other highly absorbing inclusions are present at some sites, these sites will normally damage at incident power levels below that required to damage the host material. For spherical inclusions with diameters greater than $\sim\lambda/20$, where $\lambda$ is the laser wavelength, simple heat-transfer arguments show that, under irradiation and with conduction cooling, the temperature of an inclusion of radius R initially increases as 1/R but reaches a final value proportional to R. This is illustrated in FIG. 2. Small inclusions are heated more rapidly, but reach a lower final temperature. Damage to a particular inclusion is deterministic. The statistical aspects of inclusion damage are due to the spatial distribution of the inclusions. If the irradiated spot area is sufficiently small so that some sites irradiated will be free of inclusions, the damage will be a statistical process.

Exact calculation of the inclusion damage rate $h_j(t)$ is difficult, but it is possible to obtain the qualitative features of the survival curves appropriate to inclusion damage from the heating curves shown in FIG. 2. At a given level of irradiation, all absorbers with radius less than some minimum value $R_{min}$ will escape damage, their equilibrium temperatures being less than the temperature $T_d$ required to produce damage. Slightly larger inclusions will be heated to $T_d$ by time $t_1$, when the first damage events will occur. Damage events will cease at time $t_2$ when the largest inclusion present on any site has reached $T_d$, or when irradiation ceases. The fraction of survivors $N(t)/N_0$ is unity until $t_1$. Sites containing inclusions that can be heated to damaging temperatures will damage between times $t_1$ and $t_2$. Following time $t_2$ the survival curve will again have constant value because some sites are free of damageable inclusions. An increase in the irradiation level $E_0$ will reduce both the time to first damage $t_1$ and the fraction of sites that remain undamaged. More damage events are expected under increased irradiation intensity for two reasons: (1) Some smaller and larger inclusions, which previously escaped damage, can be heated to a damaging temperature at the increased irradiation level, and (2) the effective area of the site will increase with increasing power due to the Gaussian spatial profile of the beam.

Figure 3:
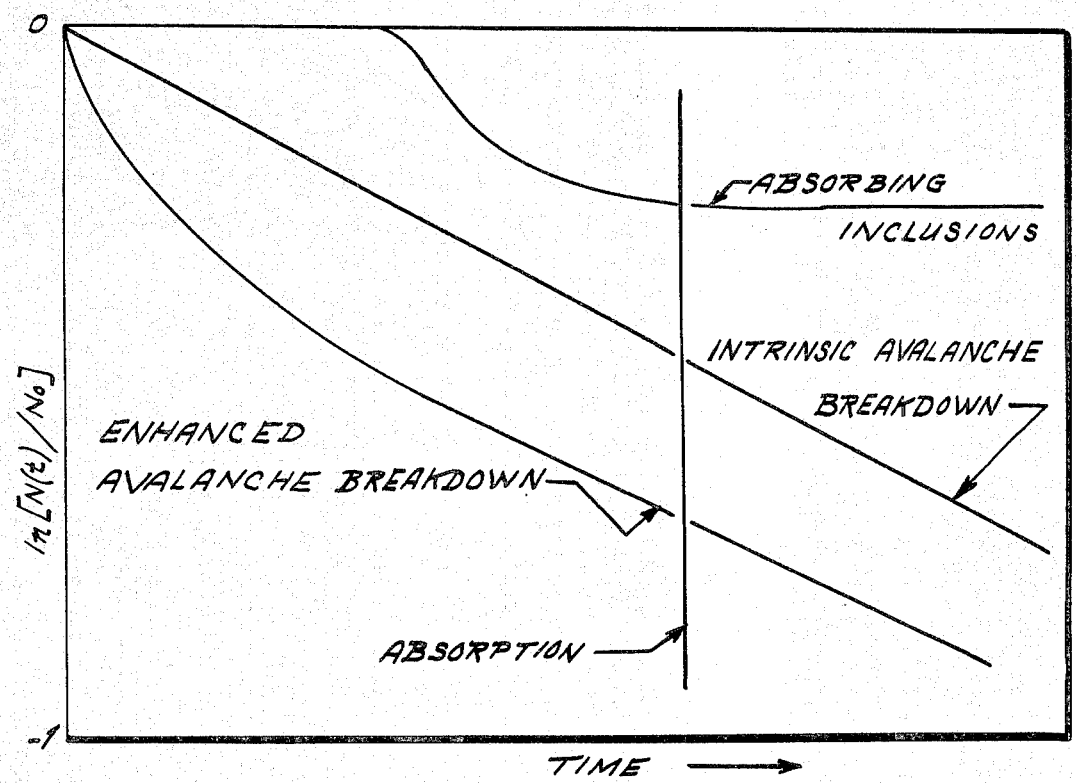
FIG. 3 represents survival curves characteristic of four damage mechanisms capable of determination by this invention.

Typical survival curves for the damage mechanisms discussed hereinabove are shown in FIG. 3. Hopefully, in a given experimental situation produced by the apparatus of this invention, one of the damage mechanisms will predominate, so that mechanism identification will be possible by comparing the shape of the experimentally determined survival curves to the characteristic shapes shown in FIG. 3, in a manner to be described in detail hereinbelow.

Reference is now made to FIG. 4 of the drawing which shows the apparatus 10 of this invention utilized in providing survival curves from damaged samples in order to determine the damage mechanism involved. Apparatus 10 is made up of any suitable $TEM_{oo}$-mode, single longitudinal mode laser source 12 which emits a smooth-waveform pulse 11 optically aligned with a sample 14 to be damaged. Sample 14 is mounted on any suitable precision translation stage 16, driven by a conventional motor 18 in order to allow irradiation of a plurality of arbitrarily chosen sites on sample 14.

The constraint of using step function waveform irradiation, which was assumed for calculation of the damage rate $h(t)$, is met by interposing any suitable shutter 20 with subnanosecond response such as a Pockels cell shutter between laser source 12 and sample 14 to extract square-waveform pulses 22 as shown in FIG. 4a from the most intense portion 24 of the smoothly varying pulses 26 (shown in FIG. 4b) emitted by laser source 12. FIG. 4c represents the waveform 28 rejected by shutter 20.

Figure 5:
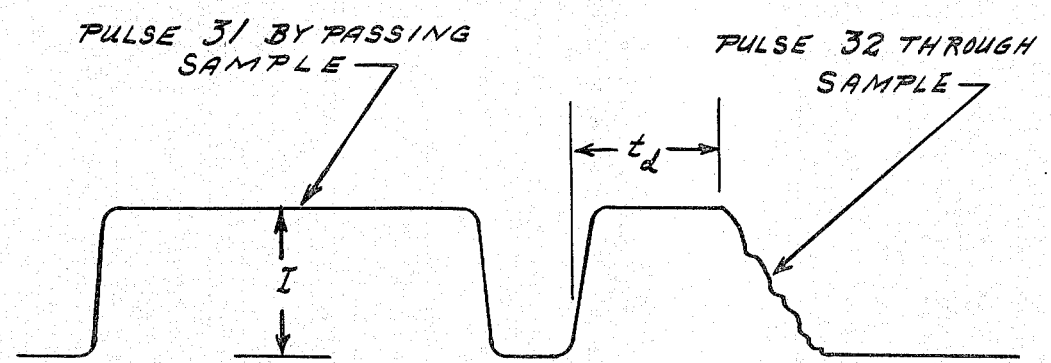
FIG. 5 is a schematic representation of both the intensity monitor pulse and the pulse transmitted through the sample as displayed on the oscilloscope of the apparatus of this invention.

Still referring to FIG. 4, a beam splitter 30 is located adjacent to shutter 20 and in optical alignment therewith in order to pick off a portion of the pulse energy 31 before the pulse 11 strikes sample 14 so as to serve as an intensity monitor in a manner to be set forth hereinbelow. The remainder of the pulse 32 passes through any suitable focusing lens 33 so as to be focused on sample 14 and then passes through any suitable recollimating lens 34 and onto any suitable fast optical waveform detector 36 such as a vacuum photodiode. In addition the portion of pulse 11 (that is, pulse 31) not transmitted through sample 14 is delayed by a plurality of beam turning mirrors 38 before being received by detector 36. Both the transmitted pulse 32 and the delayed monitor pulse 31 are then recorded as a trace on oscilloscope 40. Such a hypothetical trace being shown in FIG. 5. The pulse intensity is obtained by calibrating the height of the monitor pulse 31 against the energy arriving in the sample plane. The occurrence of damage and the survival time for each site are indicated by a change in the transmission through the sample when damage occurs. It is again emphasized that the damage mechanisms are identified by the shape of the survival curves as shown in FIG. 3 and that a knowledge of the absolute damage power level is not required. However, the absolute power levels are of interest in order to establish intrinsic damage levels when possible, and an effort should be made to measure these levels accurately.

A simplified example of determining laser-induced damage by means of this invention is set forth hereinbelow. A sample 14 to be damaged is mounted on translation stage 16 as shown in FIG. 4 and irradiated by laser source 12 at $N_0 = 8$ sites at a field strength $E_0$ as shown in FIG. 6. An oscilloscope trace is now recorded for each of the eight firings in order to determine the survival time before damage takes place at each site. The data is not sorted after the experiment except to verify that the applied electric field remains at a value $E_0$, within acceptable limits, throughout each firing or laser pulse. All data meeting this criterion of substantially the same field $E_0$ are reduced, and a table (as shown in FIG. 7) of experimental results is compiled.

The table in FIG. 7 sets forth the amount of time (nsec) which elapsed before damage took place. For example, at 0 nsec there was no damage, at 1 nsec there was one damaged site (site 2), at 2 nsec there was another damaged site (site 4), at 3 nsec there was still another damaged site (site 6), at 6 nsec there was still another damaged site (site 7) - - - . $N_{(t)}$ represents the number of sites which remained undamaged at a particular time. For example; at 0 nsec, all 8 sites were undamaged; at 2 nsec, 6 sites remained undamaged and at 3 nsec, 5 sites remained undamaged - - - . $N_0$ represents the total number of sites irradiated and therefore $N(t)/N_0$ is self explanatory.

From this compilation a survival curve $N(t)/N_0$ vs time is generated as shown in FIG. 8. For greater accuracy the curve in FIG. 8 can be changed to a $\ln [N(t)/N_0]$ vs time survival curve (not shown) and then compared with the computed curves shown in FIG. 3, thereby determining the type of damage mechanism involved with the particular sample damaged.

Although this invention has been described with reference to a particular embodiment it will be understood to those skilled in the art that this invention is also capable of a variety of alternate embodiments within the spirit and scope of the appended claims.

We claim:
1. An apparatus for determining the mechanism responsible for damage to a sample caused by electromagnetic radiation comprising a source for providing output pulses of smooth waveform, means located adjacent to and aligned with the output of said source for extracting square-waveform pulses from the most intense portion of said smooth pulses, means aligned with said square-waveform pulses for directing one portion of said square-waveform pulses in one direction and another portion of said square-waveform pulses in another direction, means aligned with both portions of said square-waveform pulses for receiving said pulses, means interposed between said directing means and said receiving means for delaying said other portion of said pulses, means located between said directing means and said receiving means for moveably mounting said sample in alignment with said one portion of said pulses and means for moving said mounting means to a plurality position in alignment with said one portion of said pulse whereby data acquired from said one portion of said pulses and said other portion of said pulses arriving at said receiving means provides information necessary in the determination of said damage mechanism.

2. An apparatus for determining the mechanism responsible for damage to a sample caused by electromagnetic radiation as defined in claim 1 wherein said source comprises a $TEM_{oo}$-mode, single longitudinal mode laser.

3. An apparatus for determining the mechanism responsible for damage to a sample caused by electromagnetic radiation as defined in claim 2 wherein said means for extracting square-waveform pulses comprises a shutter.

4. An apparatus for determining the mechanism responsible for damage to a sample caused by electromagnetic radiation as defined in claim 3 further comprising focusing means located adjacent to said mounting means.

5. An apparatus for determining the mechanism responsible for damage to a sample caused by electromagnetic radiation as defined in claim 4 wherein said directing means comprises a beam splitter.

6. An apparatus for determining the mechanism responsible for damage to a sample caused by electromagnetic radiation as defined in claim 2 further comprising an oscilloscope operably connected to said receiving means.

7. An apparatus for determining the mechanism responsible for damage to a sample caused by electromagnetic radiation as defined in claim 4 further comprising an oscilloscope operably connected to said receiving means.

8. A method of determining the mechanism responsible for damage to a sample caused by electromagnetic radiation comprising the following steps:

a. providing pulses of smooth waveform at substantially the same intensity,
b. extracting square-waveform pulses from the most intense portion of said smooth pulses,
c. dividing said square-waveform pulses into two portions,
d. passing one of said portions through said sample in an attempt to damage said sample at a plurality of sites, and then on to a detector,
e. passing the other of said portions after delay thereof onto said detector,
f. measuring the intensity of said other portion of said pulse received at said detector and measuring the time delay until damage takes place at each site from said one portion of said pulse received at said detector,
g. providing a relationship from the data acquired in step (f) between the terms $N(t)/N_0$ vs $t$ where $t$ = time, $N(t)$ = the number of said sites which remained at a particular time $t$, and $N_0$ = the total number of sites irradiated, and
h. comparing said relationship $N(t)/N_0$ vs $t$ from step (g) with a theoretical relationship of $N(t)/N_0$ vs $t$ in order to determine said damage mechanism.

9. A method of determining the mechanism responsible for damage to a sample caused by electromagnetic radiation as defined in claim 8 wherein said relationship between the terms $N(t)/N_0$ vs $t$ is in the form of a curve.

10. A method of determining the mechanism responsible for damage to a sample caused by electromagnetic radiation as defined in claim 9 wherein a $TEM_{oo}$-mode, single-longitudinal-mode laser provides said pulses of smooth waveform.

* * * * *